Figure 1:
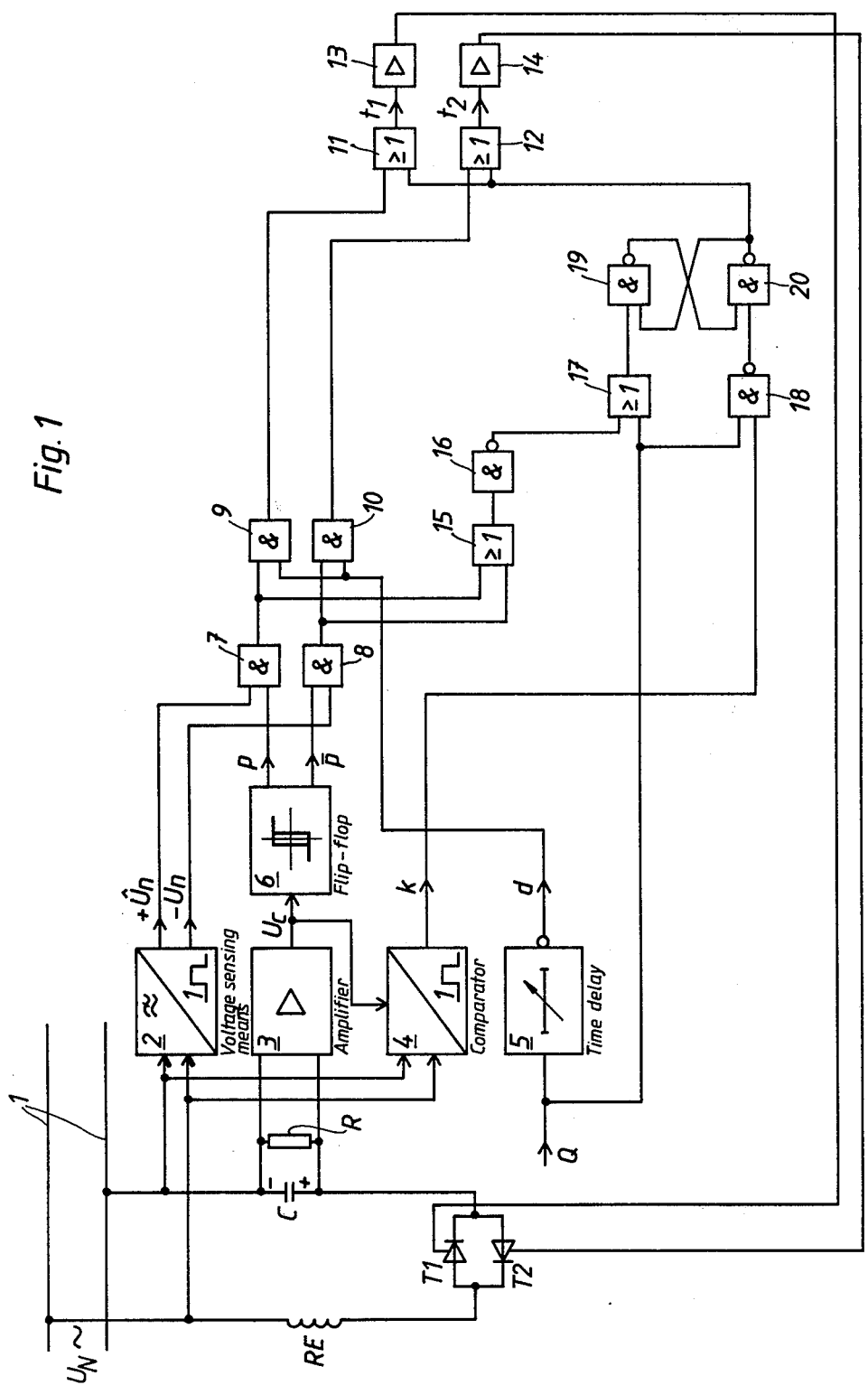

United States Patent [19]

Frank

[11] 4,162,442

[45] Jul. 24, 1979

[54] CAPACITOR EQUIPMENT

[75] Inventor: Harry Frank, Västerås, Sweden

[73] Assignee: Asea Aktiebolag, Västerås, Sweden

[21] Appl. No.: 882,158

[22] Filed: Feb. 28, 1978

[30] Foreign Application Priority Data

Oct. 13, 1977 [SE] Sweden .................... 7711515

[51] Int. Cl.² .............................. H02J 3/18
[52] U.S. Cl. .................... 323/106; 323/119
[58] Field of Search ............ 323/101, 106, 119, 128

[56] References Cited

U.S. PATENT DOCUMENTS 3,703,680   11/1972   Frank et al. .................... 323/101

FOREIGN PATENT DOCUMENTS 2303939   7/1974   Fed. Rep. of Germany ........... 323/119

OTHER PUBLICATIONS

Frank et al., "Power Factor Correction with Thyristor-Controlled Capacitors," Asea Journal, vol. 44, No. 6, 1971, pp. 180–184.

Primary Examiner—A. D. Pellinen
Attorney, Agent, or Firm—Watson, Cole, Grindle & Watson

[57] ABSTRACT

A capacitor bank for power factor correction and/or voltage control is connectible to an AC network through a bidirectional static switch. Voltage sensing and comparing means effect connection of the capacitor bank to the network at the moment when the instantaneous values of the mains and capacitor voltages coincide. During a predetermined time interval after disconnection of the capacitor bank from the network, the switch is periodically made conducting for keeping the capacitor charged with a voltage of constant polarity. After the end of this time interval, the switch is made non-conducting, whereby the capacitor is allowed to discharge through the discharge resistor.

2 Claims, 2 Drawing Figures

CAPACITOR EQUIPMENT

The present invention relates to capacitor equipment for connection to an AC network, comprising a capacitor in series with a two-way static switch, control means arranged to emit a control signal to the switch for connection and disconnection of the capacitor, and a discharge resistor for discharging the capacitor after its disconnection from the network.

Equipment of this kind comprises one or more capacitors or capacitor groups, each having a switch for connection and disconnection, and they are used, for example, for power factor correction, voltage control or stability increase.

It is previously known to maintain disconnected capacitors charged to the peak value of the mains voltage and to perform the connection at or in the vicinity of the maximum of the mains voltage. The disconnected capacitors are then subjected to a constant direct voltage, which necessitates the use of expensive direct voltage capacitors.

It is further known (through U.S. Pat. No. 3,703,680) that disconnected and charged capacitors can be periodically repolarized. This makes possible the use of economically advantageous alternating voltage capacitors. Each repolarization, however, gives rise to a transient current and thus a transient voltage in the network, which may be a drawback for certain applications (for example in the form of inconvenient blinkings in lighting connected to the network).

It is further known (through German Offenlegungsschrift No. 23 03 939) to avoid DC voltage stresses on the capacitors by discharging the capacitors completely immediately (within a quarter period) after the disconnection, and by charging the capacitors to the peak value of the mains voltage immediately (within a quarter period) prior to connection. Also in this case inconvenient current surges and voltage transients will occur in the network (particularly during discharging).

Further it is known—and often a requirement for safety reasons—to provide a discharge resistor connected in parallel with the capacitor, which discharge resistor slowly discharges the capacitor, typically with a time constant of a few minutes.

The invention aims to provide a device of the kind mentioned in the introduction, in which AC capacitors can be used, in which the inconvenient current surges during repolarization and discharging are completely avoided, and in which the charging current surge is reduced to a minimum.

What characterises the invention will be clear from the appended claims.

According to the invention, the discharge resistor - which as a rule is already present in the device - is used for discharging the capacitor after disconnection. This results in a slow discharge totally free from disturbing current surges. An order about renewed connection can be obtained at any time after the disconnection, thus also before the capacitor is fully discharged. To reduce the charging current surge, according to the invention the capacitor voltage and the instantaneous value of the mains voltage are sensed and a control signal to the switch for connection of the capacitor is emitted in dependence on the difference between these voltages. According to a preferred embodiment, the switch is controlled to the on-state at the moment when the mains voltage is equal to the capacitor voltage, but the control signal to the switch can alternatively be emitted somewhat earlier or somewhat later than this moment. It has proved that the charging current surge, and thus the voltage transients in the network, are thus limited to a minimum.

According to one embodiment, the capacitor is kept charged to the peak value of the mains voltage during a time interval after the disconnection by emitting periodical control pulses to the switch, suitably during a predetermined time after the disconnection, for example 30-60 seconds, for it has proved that the capacitors are often connected and disconnected at regular intervals, for example in case of disturbances in the network. By keeping the capacitor charged for a period after each disconnection, also the charging current surges are completely avoided during such operations. The brief DC voltage stress does not involve any drawback as far as the capacitor is concerned.

In the following the invention will be described with reference to the accompanying drawings, in which FIG. 1 shows a device according to the invention and FIG. 2 the behaviour of some of the quantities and signals present in the device.

A capacitor C is connected to a DC voltage network 1 with voltage $U_N$ via two anti-parallel connected thyristors T1 and T2. In series with the capacitor a small reactor RE is arranged for limiting the time derivative of the current through the thyristors. The capacitor is used for generating reactive power. In a typical case it forms part of a larger device with a plurality of capacitors which can be connected and disconnected according to the need of capacitive power. Normally, a three-phase network is used, and the capacitors are then connected between the phase conductors, or between the phase conductors and the neutral point of the network. A device of this kind can be used for compensating the reactive power consumed by inductive consumers, for voltage stabilization, or for increasing the stability of a network.

The capacitor is provided, in a manner known per se, with a discharge resistor R which, after disconnection, discharges the capacitor with a time constant of, for example, one or a few minutes.

Connection and disconnection of the capacitor are controlled by a signal Q, which may be obtained, for example, from a superordinate control device. When Q=1, the capacitor should be connected, and when Q=0 the capacitor should be disconnected.

A unit 2 senses the mains voltage $U_N$ and emits short pulses $+\hat{U}_N$ and $-\hat{U}_N$ at the positive and negative maximum values, respectively, of the mains voltage. Pulses $+\hat{U}_N$ are drawn with continuous lines and pulses $-\hat{U}_N$ are shown in dashed lines in FIG. 2.

A measuring device 3, which in principle may be an amplifier connected to a voltage divider, emits a signal $U_C$ which corresponds to the voltage across capacitor C.

A comparison device 4 is supplied with mains voltage $U_N$ and capacitor voltage $U_C$ and emits a short pulse k when $U_C = U_N$.

When Q is changed from 1 to 0, a delay circuit 5 emits a logical one for a predetermined time, for example 60 seconds (signal d).

A level flip-flop 6 emits signal p and its inverse $\bar{p}$, where p=1 if $U_C>0$ and p=0 if $U_C<0$.

The control equipment is further built up from AND circuits 7, 8, 9, 10, 16, 18, 19, 20 and OR circuits 11, 12, 15, 17.

AND circuits 19 and 20 form a flip-flop. Upon connection of the capacitor, the output signal from circuit 20 becomes a one, and "ones" are then emitted from circuits 11 and 12 (signals $t_1$ and $t_2$). Control devices 13 and 14 then emit continuous control signals to thyristors T1 and T2 which alternately conduct the capacitor current for one half-period each.

Flip-flop 19-20 is set by a "zero" from circuit 18, i.e. when signals Q and k simultaneously become "ones". The flip-flop is reset if the output signal from circuit 17 becomes zero, which occurs when both Q and the output signal from circuit 16 become zero.

Upon an order to connect the capacitor, Q=1. When, thereafter, $U_C = U_N$, a short pulse k is emitted from unit 4, flip-flop 19-20 is energized and control current is supplied to the thyristors.

When the capacitor is to be disconnected, Q becomes equal to 0. At the next maximum of $U_N$, a short pulse is obtained from one of circuits 7 or 8, and a short zero pulse is emitted via circuits 15, 16 and 17 to the flip-flop, which is then reset, the thyristors thus becoming non-conducting.

After disconnection, signal d from circuit 5 is a "one" during the above-mentioned predetermined period. During this period, short ignition pulses are emitted via circuits 7, 8, 9, 10 once every period to one of the thyristors for maintaining the charge of a capacitor, the voltage of which during this period remains the same as at the moment of disconnection. When signal d becomes zero after the expiration of the predetermined time, the ignition pulses cease and the capacitor is slowly discharged through resistor R.

Figure 2:
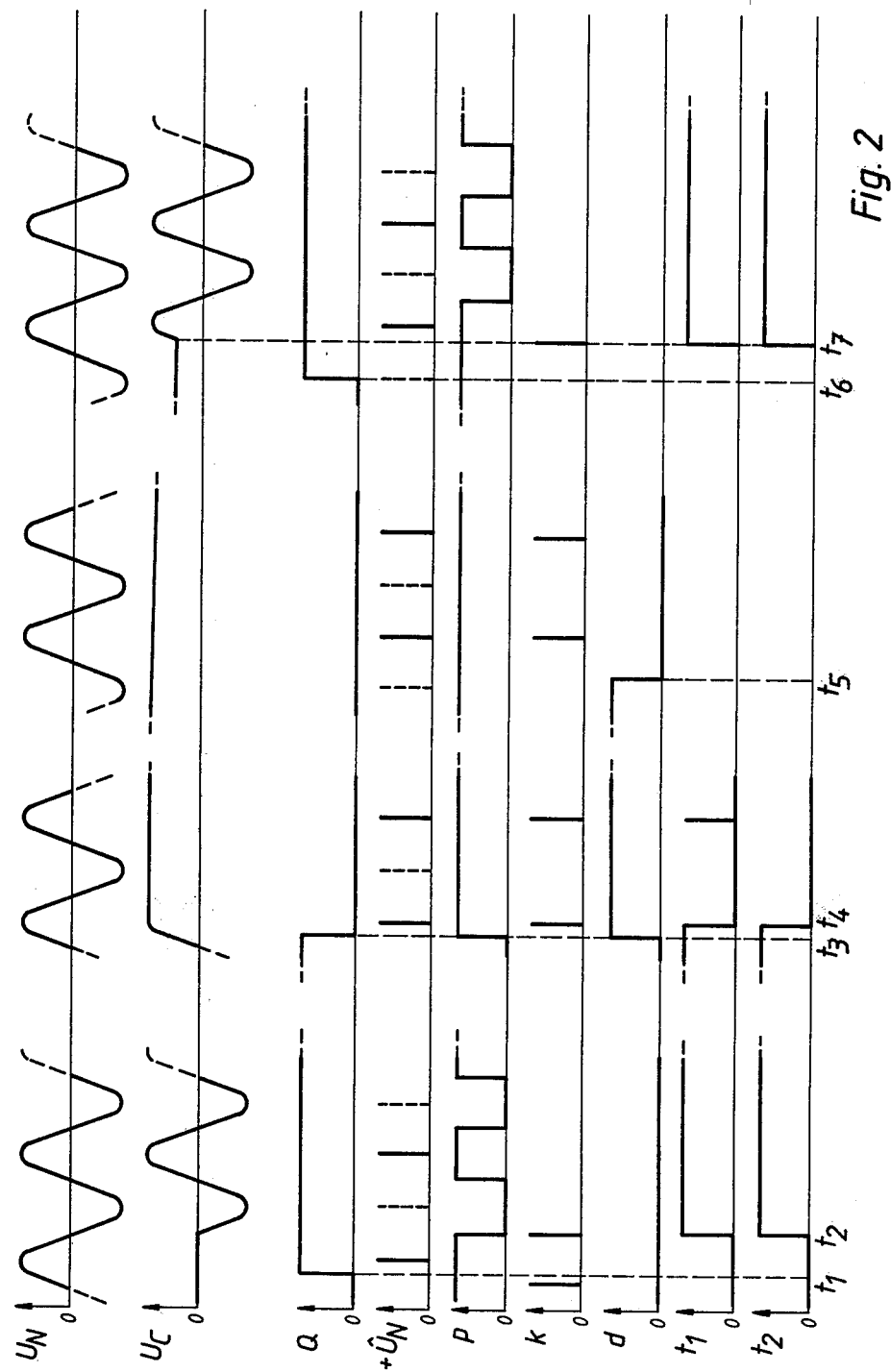

The function of the equipment will now be described with reference to FIG. 2 showing at the top $U_N$ and $U_C$, and therebelow Q, $+\hat{U}_N$, p, k, d, $t_1$, $t_2$ as functions of the time. At the initial position, the capacitor is assumed to be fully discharged, i.e. $U_C = 0$. At $t = t_1$, Q=1, which indicates that the capacitor shall be connected. At $t = t_2$, $U_N = U_C = 0$ and a short pulse k=1 is emitted from unit 4. Flip-flop 19-20 is set and a continuous control signal is emitted to the thyristors, so that these start carrying current alternately. The capacitor is now connected to the network and $U_C$ follows $U_N$ (apart from the negligible voltage drop in the reactor and the thyristors).

At $t = t_3$, the desired disconnection of the capacitor is indicated by Q becoming zero. At the next positive or negative mains voltage maximum (in this case the positive) a short one-pulse is emitted (at $t = t_4$) from unit 2 via circuits 7 and 15 to circuit 16, which then, via circuit 17, emits a short zero-pulse which resets flip-flop 19-20. The output signal from circuit 20 then becomes zero and the continuous control signal to the thyristors ceases.

At the same time as Q becomes zero, the output signal d from circuit 5 becomes a one. The capacitor remains charged to the positive peak value of the mains voltage and the signal p from unit 6 is one. At each positive mains voltage maximum, pulse $+\hat{U}_N$ is therefore forwarded via circuits 7, 9 and 11 to control device 13, which emits a short control pulse to thyristor T1. The capacitor voltage (which has time to drop somewhat during a period) is thus restored once every period to the positive peak value of the mains voltage, and the capacitor thus remains charged, during the time determined by circuit 5, to the voltage it had at the moment of disconnection, i.e. the positive peak value of the mains voltage.

At $t = t_5$, the above-mentioned predetermined time has expired and d becomes zero. No ignition pulses are then supplied to the thyristors, and the capacitor is slowly discharged through resistor R.

Before the capacitor has been completely discharged, Q becomes equal to 1 at $t = t_6$, i.e. the capacitor shall be connected again. At $t = t_7$, when $U_N = U_C$, circuit 4 emits a pulse k to circuit 18 which sets flip-flop 19-20, the capacitor thus being connected and remaining connected.

In the equipment described above, the capacitor is connected to the network at the moment when $U_N = U_C$. It is not necessary for the control signal to the thyristors to be emitted exactly at that moment. It can be emitted at a somewhat earlier or later state, i.e. the control means may, for example, emit a control signal when $$|U_N - U_C| < \Delta$$

where $\Delta$ is a constant value. If $\Delta = 0$, the case described above is obtained.

I claim:

1. Capacitor equipment for connection to an AC network, comprising a capacitor connected in series with a bi-directional static switch for connection to the network and disconnection from the network of the capacitor, a discharge resistor connected to the capacitor for discharging the capacitor after said disconnection, voltage sensing means for sensing the instantaneous values of the AC network voltage and of the capacitor voltage, comparator means connected to said voltage sensing means and to said switch for connecting said capacitor to the network when the difference between said instantaneous values is lower than a predetermined level, means for periodically making said switch conducting during a predetermined time interval after disconnection of the capacitor from the network, thereby keeping said capacitor charged with a voltage of constant polarity during said interval, and means for making said switch non-conducting after the end of said interval, thereby allowing the capacitor to discharge through said discharge resistor.

2. Capacitor equipment according to claim 1, wherein said comparator means is arranged to cause said switch to connect said capacitor to said network when the instantaneous value of the voltage in the AC network coincides with the capacitor voltage.

* * * * *